(12) United States Patent
Yoda

(10) Patent No.: US 9,310,393 B2
(45) Date of Patent: Apr. 12, 2016

(54) PHYSICAL QUANTITY SENSOR AND ELECTRONIC APPARATUS

(75) Inventor: Mitsuhiro Yoda, Shiojiri (JP)

(73) Assignee: Seiko Epson Corporation (JP)

(*) Notice: Subject to any disclaimer, the term of this patent is extended or adjusted under 35 U.S.C. 154(b) by 344 days.

(21) Appl. No.: 13/569,493

(22) Filed: Aug. 8, 2012

(65) Prior Publication Data

US 2013/0042685 A1 Feb. 21, 2013

(30) Foreign Application Priority Data

Aug. 17, 2011 (JP) ................................. 2011-178253

(51) Int. Cl.
*G01P 15/00* (2006.01)
*G01P 15/125* (2006.01)
*G01P 15/08* (2006.01)

(52) U.S. Cl.
CPC ........... *G01P 15/125* (2013.01); *G01P 15/0802* (2013.01); *G01P 2015/0814* (2013.01)

(58) Field of Classification Search
USPC ........................................ 73/514.32, 514.16
See application file for complete search history.

(56) References Cited

U.S. PATENT DOCUMENTS

| | | | |
|---|---|---|---|
| 5,198,390 A * | 3/1993 | MacDonald et al. ............ | 438/52 |
| 5,565,625 A * | 10/1996 | Howe et al. ................ | 73/514.16 |
| 5,627,317 A | 5/1997 | Offenberg et al. | |
| 5,719,073 A | 2/1998 | Shaw et al. | |
| 5,723,353 A * | 3/1998 | Muenzel et al. ................ | 438/48 |
| 5,846,849 A * | 12/1998 | Shaw et al. ..................... | 438/52 |
| 5,959,208 A * | 9/1999 | Muenzel et al. ............ | 73/514.32 |
| 6,170,332 B1 | 1/2001 | MacDonald et al. | |
| 6,171,881 B1 | 1/2001 | Fujii | |
| 6,388,300 B1 * | 5/2002 | Kano et al. ..................... | 257/419 |
| 6,494,096 B2 | 12/2002 | Sakai et al. | |
| 6,792,804 B2 * | 9/2004 | Adams et al. ............... | 73/514.32 |
| 2003/0159513 A1 * | 8/2003 | Nagahara et al. .......... | 73/514.16 |
| 2004/0094814 A1 * | 5/2004 | Yoshioka et al. ............. | 257/414 |
| 2004/0187571 A1 * | 9/2004 | Goto .......................... | 73/504.14 |
| 2006/0005626 A1 * | 1/2006 | Luo et al. ................... | 73/514.09 |
| 2007/0007607 A1 * | 1/2007 | Sakai et al. .................... | 257/414 |
| 2009/0007669 A1 * | 1/2009 | Fukaura ..................... | 73/514.32 |
| 2009/0166623 A1 * | 7/2009 | Sato et al. ........................ | 257/49 |

FOREIGN PATENT DOCUMENTS

| | | |
|---|---|---|
| JP | 04-044342 A | 2/1992 |
| JP | 05-304303 | 11/1993 |
| JP | 07-333078 | 12/1995 |
| JP | 08-506857 | 7/1996 |
| JP | 2000-286430 | 10/2000 |
| JP | 2006-349563 A | 12/2006 |
| JP | 2008-089327 A | 4/2008 |

* cited by examiner

*Primary Examiner* — Hezron E Williams
*Assistant Examiner* — Xin Zhong
(74) *Attorney, Agent, or Firm* — Harness, Dickey & Pierce, PLC

(57) ABSTRACT

A physical quantity sensor includes a base substrate, a movable part located on the base substrate and provided on a principal surface of the base substrate, a movable electrode part provided in the movable part, and a fixed electrode part provided on the principal surface of the base substrate and located to be opposed to a movable electrode finger, and the fixed electrode part is connected to fixed electrode wiring provided at the principal surface side of the base substrate, the movable electrode part is connected to movable electrode wiring provided at the principal surface side of the base substrate, and a shield part is provided between the fixed electrode wiring and the movable electrode wiring.

15 Claims, 8 Drawing Sheets

PHYSICAL QUANTITY SENSOR AND ELECTRONIC APPARATUS

BACKGROUND

1. Technical Field

The present invention relates to a physical quantity sensor and an electronic apparatus including the physical quantity sensor.

2. Related Art

In related art, as a physical quantity sensor, a semiconductor dynamic quantity sensor (hereinafter, referred to as "physical quantity sensor") including a base plate part sectioned by a cavity formed in a semiconductor substrate to extend in a lateral direction and located under the cavity, a frame part sectioned by a groove formed in the cavity and the semiconductor substrate to extend in a longitudinal direction and located at the side of the cavity and the groove, a beam structure sectioned by the cavity and the groove, located on the cavity, extending from the frame part, and having a movable electrode that is displaced in response to a dynamic quantity (for example, acceleration), a fixed electrode sectioned by the cavity and the groove, located on the cavity, extending from the frame part, and provided to be opposed to the movable electrode of the beam structure has been known (for example, see Patent Document 1 (JP-A-2000-286430)).

According to Patent Document 1, the physical quantity sensor is a capacitance change detection type, and a wire from the first fixed electrode (hereinafter, referred to as "first wire") and a wire from the second fixed electrode (hereinafter, referred to as "second wire") are provided on one surface of the semiconductor substrate and potentials of the first fixed electrode and the second fixed electrode can be extracted to the outside.

In the physical quantity sensor, it is necessary to provide the first wire and the second wire closer to each other for downsizing, and a parasitic capacitance (stray capacitance) between the first wire and the second wire may be increased.

Thereby, in the physical quantity sensor, the increased parasitic capacitance is added to the detected original electrostatic capacitance, and thus, detection characteristics such as detection accuracy as a capacitance change detection type physical quantity sensor may be deteriorated.

As a result, in the physical quantity sensor, reliability in physical quantity detection may be damaged. Specifically, in the case of a differential detection physical quantity sensor, reduction of the parasitic capacitance between wiring of a fixed electrode and wiring of a movable electrode has been an issue.

SUMMARY

An advantage of some aspects of the invention is to solve at least a part of the problems described above, and the invention can be implemented as the following embodiments and application examples.

Application Example 1

A physical quantity sensor according to this application example includes a substrate, a movable part supported on the substrate, a movable electrode part provided in the movable part, and a fixed electrode part provided on a principal surface of the substrate and located to be opposed to the movable electrode part, wherein the fixed electrode part is connected to fixed electrode wiring provided on the principal surface of the substrate, the movable electrode part is connected to movable electrode wiring provided on the principal surface of the substrate, and a first shield part is provided in at least one part between the fixed electrode wiring and the movable electrode wiring.

According to the configuration, in the physical quantity sensor, the fixed electrode part is connected to the fixed electrode wiring, the movable electrode part is connected to the movable electrode wiring via the movable part, and the shield part is provided in at least one part between the fixed electrode wiring and the movable electrode wiring.

Thereby, in the physical quantity sensor, the parasitic capacitance between the fixed electrode wiring and the movable electrode wiring at physical quantity detection is reduced by the shield part, and the difference between the detected electrostatic capacitance value and the original electrostatic capacitance value may be reduced.

Therefore, in the physical quantity sensor, detection characteristics such as detection accuracy may be improved.

As a result, in the physical quantity sensor, reliability in physical quantity detection may be improved.

Application Example 2

In the physical quantity sensor according to the application example, it is preferable that the fixed electrode part has a first fixed electrode part located at one side of the movable electrode part and a second fixed electrode part located at the other side, the fixed electrode wiring includes a first wire connected to the first fixed electrode part and a second wire connected to the second fixed electrode part, and a second shield part is provided in at least one part between the first wire and the second wire.

According to the configuration, in the physical quantity sensor, the shield part is provided in at least one part between the first wire and the second wire of the fixed electrode wiring, and thus, the parasitic capacitance between the first wire and the second wire at physical quantity detection is reduced by the shield part. From this, in the physical quantity sensor, for example, the difference between the detected electrostatic capacitance value and the original electrostatic capacitance value may be further reduced.

Therefore, in the physical quantity sensor, detection characteristics such as detection accuracy may be further improved. As a result, in the physical quantity sensor, reliability in physical quantity detection may be further improved.

Application Example 3

In the physical quantity sensor according to the application example, it is preferable that an insulating material is used for the substrate, and a semiconductor material is used for the movable part, the movable electrode part, and the fixed electrode part.

According to the configuration, in the physical quantity sensor, the insulating material is used for the substrate and the semiconductor material is used for the movable part, the movable electrode part, and the fixed electrode part, and thus, insulation and isolation between the substrate and the movable part, the movable electrode part, and the fixed electrode part may be reliably performed.

Application Example 4

In the physical quantity sensor according to the application example, it is preferable that the same material as that of the movable part, the movable electrode part, and the fixed electrode part is used for the first shield part.

According to the configuration, in the physical quantity sensor, the same material as that of the movable part, the movable electrode part, and the fixed electrode part is used for the shield part, and thus, for example, the shield part, the movable part, the movable electrode part, and the fixed electrode part may be collectively formed using a photolithography technology and an etching technology, for example.

As a result, in the physical quantity sensor, productivity may be improved compared to the case where different materials are used for the shield part, the movable part, the movable electrode part, and the fixed electrode part.

Application Example 5

In the physical quantity sensor according to the application example, it is preferable that plural recess parts are provided on the principal surface of the substrate, and the fixed electrode wiring or the movable electrode wiring is provided within each of the recess parts.

According to the configuration, in the physical quantity sensor, the plural recess parts are provided on the principal surface of the substrate and the fixed electrode wiring and the movable electrode wiring are provided within the respective recess parts, and thus, projection of the respective wiring from the principal surface may be avoided.

As a result, in the physical quantity sensor, short circuit between the respective wiring and non-connection members (for example, between the first wire and the second fixed electrode part and between the second wire and the first fixed electrode part) may be avoided.

Further, in the physical quantity sensor, the respective wiring may be further separated by the recess parts, and thus, the parasitic capacitances between the respective wiring at physical quantity detection may be further reduced.

Application Example 6

An electronic apparatus according to this application example includes the physical quantity sensor according to any one of the application examples.

Accordingly, the electronic apparatus having the configuration includes the physical quantity sensor according to any one of the application examples, and thus, an electronic apparatus that exerts the effect according to any one of the application examples may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, an embodiment implementing the invention will be explained with reference to the drawings.

Embodiment

First, a configuration of a physical quantity sensor of a capacitance change detection type that detects physical quantities such as acceleration and angular velocities, for example, according to the embodiment will be explained.

Figure 1:
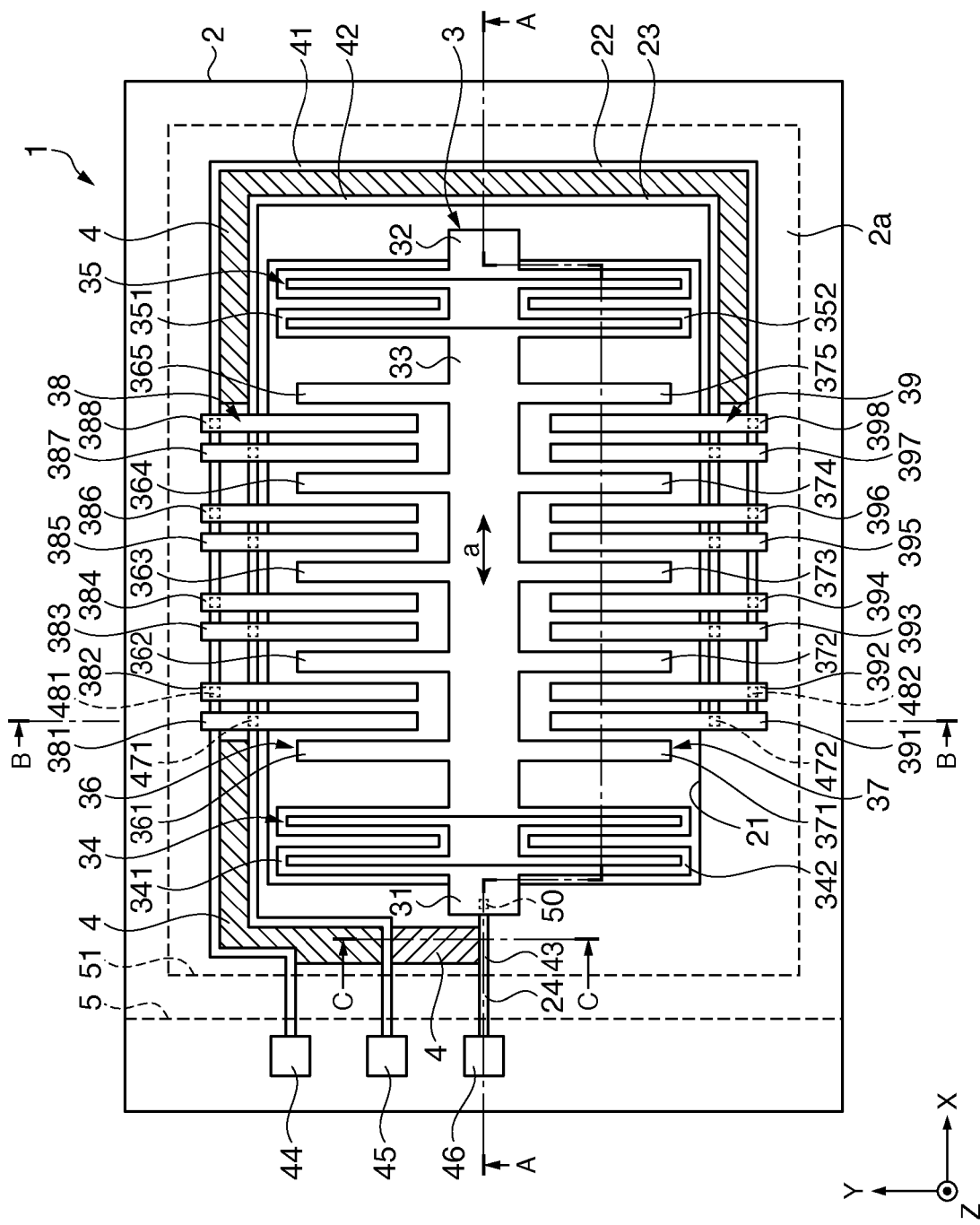
FIG. 1 is a schematic plan view showing a general configuration of a physical quantity sensor of an embodiment.
Figure 2:
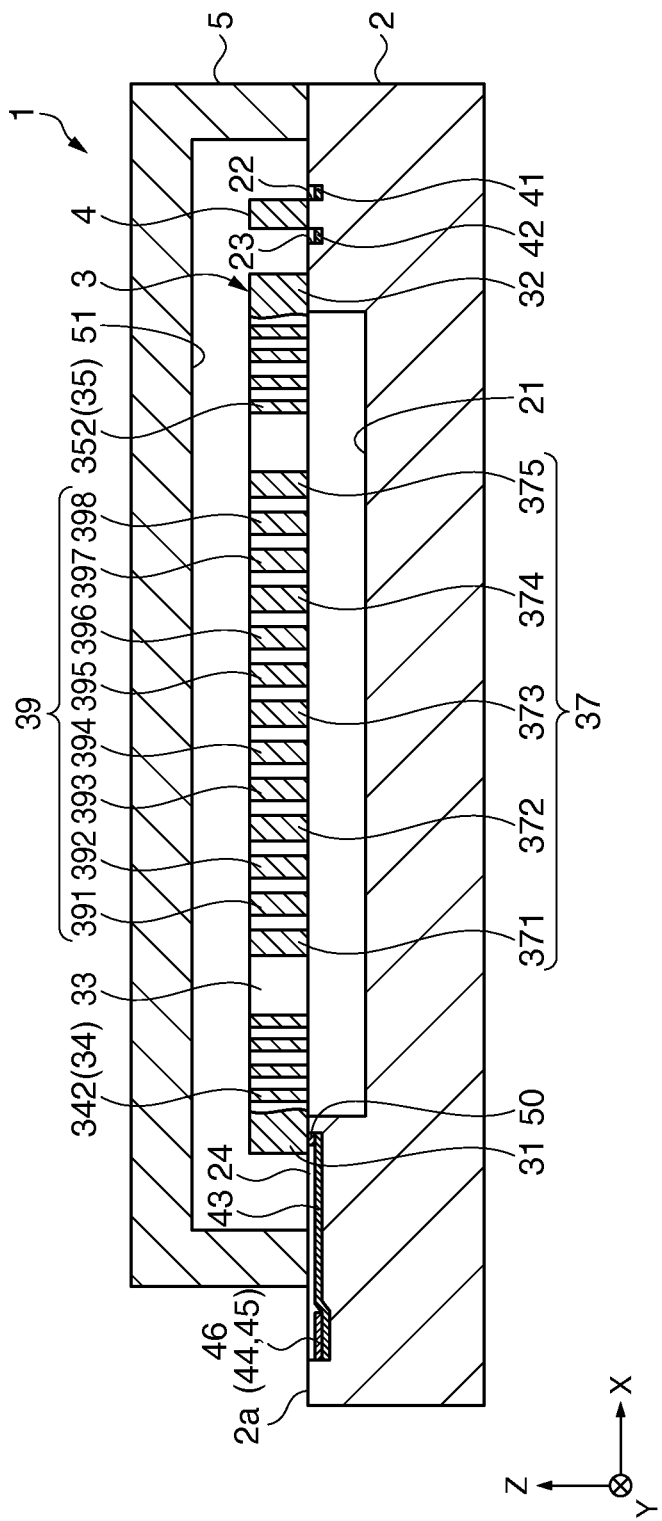
FIG. 2 is a schematic sectional view along A-A line in FIG. 1.
Figure 3:
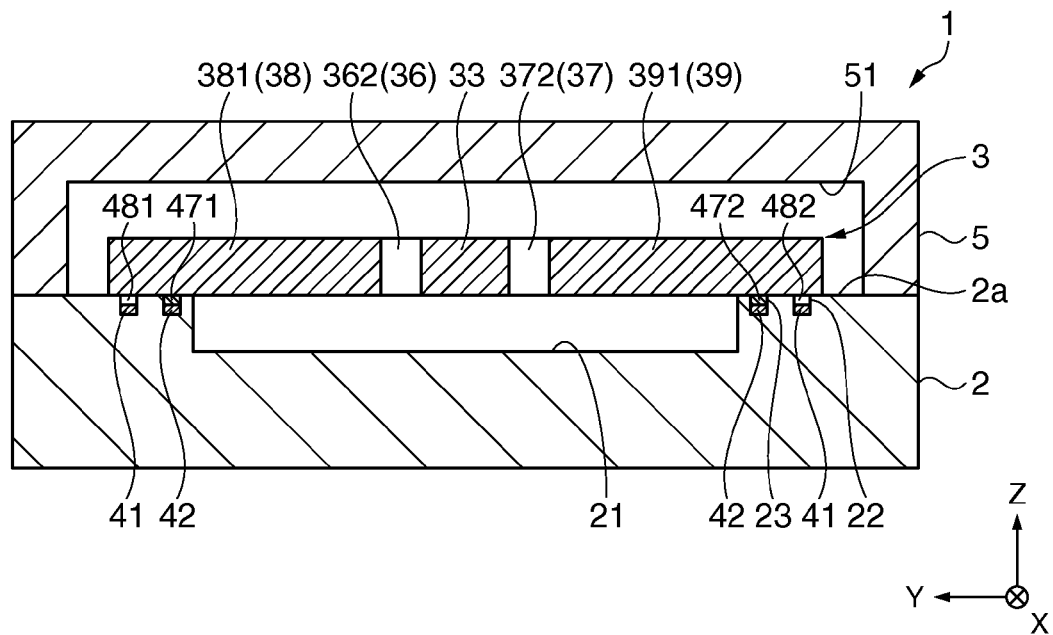
FIG. 3 is a schematic sectional view along B-B line in FIG. 1.
Figure 4:
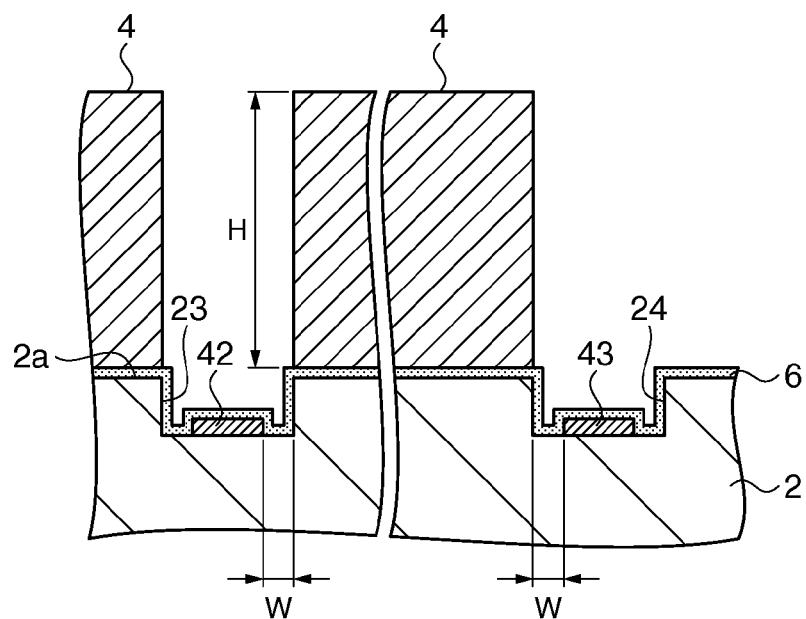
FIG. 4 is a schematic sectional view of a main part along C-C line in FIG. 1.

FIG. 1 is a schematic plan view showing a general configuration of a physical quantity sensor of the embodiment, FIG. 2 is a schematic sectional view along A-A line in FIG. 1, FIG. 3 is a schematic sectional view along B-B line in FIG. 1, and FIG. 4 is a schematic sectional view of a main part along C-C line in FIG. 1.

For convenience of explanation, the dimension ratios of the respective component elements are different from actual dimension ratios. Further, in FIG. 1, a lid member is shown by a broken line.

As below, for convenience of explanation, the front side of the paper in FIG. 1 is referred to as "up", the depth side of the paper is referred to as "down", the right side is referred to as "right", and the left side is referred to as "left". Further, in FIGS. 1 to 3, an X-axis, a Y-axis, and a Z-axis are shown as three axes orthogonal to one another. Furthermore, hereinafter, the direction in parallel to the X-axis (lateral direction) is referred to as "X-axis direction", the direction in parallel to the Y-axis is referred to as "Y-axis direction", and the direction in parallel to the Z-axis (vertical direction) is referred to as "Z-axis direction".

As shown in FIGS. 1 to 4, a physical quantity sensor 1 includes a base substrate 2 as a substrate, a sensor element 3 supported by the base substrate 2, a shield part 4 provided on the base substrate 2, and a lid member 5 provided to cover the sensor element 3 and the shield part 4.

The base substrate 2 has a function of supporting the sensor element 3.

The base substrate 2 has a plate-like shape, and a recess part 21 is provided on a principal surface 2a as the upper surface thereof. The recess part 21 is formed so that a movable part 33, movable electrode parts 36, 37, and connection parts 34, 35 of the sensor element 3, which will be described later, may be accommodated in a plan view of the base substrate 2.

The recess part 21 forms a clearance part for avoiding contact of the movable part 33, the movable electrode parts 36, 37, and the connection parts 34, 35 of the sensor element 3 with the base substrate 2. Thereby, the base substrate 2 allows displacement of the movable part 33 of the sensor element 3.

Note that the clearance part may be a through hole penetrating the base substrate 2 in its thickness direction (Z-axis direction) in place of the recess part 21. Further, in the embodiment, the shape of the recess part 21 in the plan view is a square shape (specifically, a rectangular shape), but not limited to that.

Further, on the principal surface 2a of the base substrate 2, a recess part 22 is provided outside of the above described recess part 21 along the outer periphery. One end side of the recess part 22 extends to the outer periphery part of the base substrate 2. Furthermore, a recess part 23 is provided outside of the recess part 21 of the principal surface 2a of the base substrate 2 and between the recess part 22 and the recess part 21 along the recess part 22. One end side of the recess part 23 extends to the outer periphery part of the base substrate 2.

Moreover, a recess part 24 is provided on the principal surface 2a of the base substrate 2 from the vicinity of the left edge part of the recess part 21 along the recess part 23 to the outer periphery part of the base substrate 2.

The recess parts 22 to 24 have shapes corresponding to wires in the plan view. Specifically, the recess part 22 has the shape corresponding to a wire 41 as a first wire of fixed electrode wiring and an electrode 44 as a connection terminal, which will be described later, the recess part 23 has the shape corresponding to a wire 42 as a second wire of the fixed electrode wiring and an electrode 45 as a connection terminal, which will be described later, and the recess part 24 has the shape corresponding to a wire 43 as a movable electrode wiring and an electrode 46 as a connection terminal, which will be described later.

Here, the depth dimensions of the recess parts 22 to 24 are larger than the thickness dimensions of the wires 41 to 43, respectively.

Further, the depths of the parts in which the electrodes 44 to 46 of the recess parts 22 to 24 are provided are deeper than the parts in which the wires 41 to 43 are provided, respectively.

By making the depths of the parts of the recess parts 22 to 24 deeper, in manufacturing of the physical quantity sensor 1, which will be described later, the electrodes 44 to 46 may be prevented from jointing to a sensor substrate to be the sensor element 3 later or contacting with external member.

As a constituent material of the base substrate 2, specifically, a high-resistance silicon material or glass material having insulation properties (an insulating material) is preferably used. Especially, in the case where the sensor element 3 is formed using a silicon substrate including a silicon material as a principal material, a glass material containing alkali metal ions (movable ions) (for example, borosilicate glass such as Pyrex (registered trademark) glass) is preferably used.

Thereby, in the physical quantity sensor 1, the base substrate 2 (glass substrate) and the sensor element 3 (silicon substrate) may be anodically bonded.

Further, it is preferable that the constituent material of the base substrate 2 has a difference in coefficient of thermal expansion from the constituent material of the sensor element 3 as small as possible, and specifically, it is preferable that the difference in coefficient of thermal expansion between the constituent material of the base substrate 2 and the constituent material of the sensor element 3 is 3 ppm/° C. or less. Thereby, even when the physical quantity sensor 1 is exposed to a high temperature in bonding of the base substrate 2 and the sensor element 3, residual stress (thermal stress) between the base substrate 2 and the sensor element 3 may be reduced.

The sensor element 3 includes fixed parts 31, 32, the movable part 33, the connection parts 34, 35, the movable electrode parts 36, 37, and fixed electrode parts 38, 39.

In the sensor element 3, the movable part 33 and the movable electrode parts 36, 37 are displaced in the X-axis direction (+X direction or −X direction) while elastically deforming the connection parts 34, 35 in response to changes in physical quantities such as acceleration and angular velocities, for example. In the physical quantity sensor 1, sizes of a gap between the movable electrode part 36 and the fixed electrode part 38 and a gap between the movable electrode part 37 and the fixed electrode part 39 are respectively changed according to the displacement.

That is, in the physical quantity sensor 1, magnitudes of an electrostatic capacitance between the movable electrode part 36 and the fixed electrode part 38 and an electrostatic capacitance between the movable electrode part 37 and the fixed electrode part 39 are respectively changed according to the displacement. Therefore, the physical quantity sensor 1 may detect the physical quantities such as acceleration and angular velocities based on the changes of the electrostatic capacitances as a differential detection physical quantity sensor.

The fixed parts 31, 32, the movable part 33, the connection parts 34, 35, and the movable electrode parts 36, 37 are integrally formed from one silicon substrate, for example.

The fixed parts 31, 32 are respectively bonded to the above described principal surface 2a of the base substrate 2. Specifically, the fixed part 31 is bonded to a part at the −X direction side (on the left in the drawing) with respect to the recess part 21 of the principal surface 2a of the base substrate 2, and the fixed part 32 is bonded to a part at the +X direction side (on the right in the drawing) with respect to the recess part 21. Further, the fixed parts 31, 32 are respectively provided over the recess part 21 and the outer periphery part of the recess part 21 in the plan view.

Note that the positions and shapes of the fixed parts 31, 32 are determined in response to the positions, shapes, etc. of the connection parts 34, 35 and the wires 41 to 43, and not limited to the above described configuration.

The movable part 33 is provided between the two fixed parts 31, 32. In the embodiment, the movable part 33 has a longitudinal shape extending in the X-axis direction. Note that the shape of the movable part 33 is determined in response to the shapes, sizes, etc. of the respective parts forming the sensor element 3, and not limited to the above described configuration.

The movable part 33 is connected to the fixed part 31 via the connection part 34, and connected to the fixed part 32 via the connection part 35. More specifically, the left end of the movable part 33 is connected to the fixed part 31 via the connection part 34, and the right end of the movable part 33 is connected to the fixed part 32 via the connection part 35.

The connection parts 34, 35 displaceably connect the movable part 33 to the fixed parts 31, 32. In the embodiment, the connection parts 34, 35 are adapted to displace the movable part 33 in the X-axis direction (+X direction or −X direction) as shown by an arrow a in FIG. 1.

Specifically, the connection part 34 includes two beams 341, 342. Further, the beams 341, 342 respectively have shapes extending in the X-axis direction while meandering in the Y-axis direction. In other words, the beams 341, 342 have shapes turned at plural times (three times in the embodiment) in the Y-axis direction. Note that the numbers of turns of the respective beams 341, 342 may be one, two, four, or more.

Similarly, the connection part 35 includes two beams 351, 352 having shapes extending in the X-axis direction while meandering in the Y-axis direction.

The movable electrode part 36 is provided at one side (+Y direction side) in the width direction of the movable part 33 displaceably supported in the X-axis direction with respect to the base substrate 2, and the movable electrode part 37 is provided at the other side (−Y direction side).

The movable electrode part 36 includes plural movable electrode fingers 361 to 365 projecting from the movable part 33 in the +Y direction and arranged like teeth of a comb. The movable electrode fingers 361, 362, 363, 364, 365 are arranged from the −X direction side to the +X direction side in this order. Similarly, the movable electrode part 37 includes plural movable electrode fingers 371 to 375 projecting from the movable part 33 in the −Y direction and arranged like teeth of a comb. The movable electrode fingers 371, 372, 373, 374, 375 are arranged from the −X direction side to the +X direction side in this order.

The plural movable electrode fingers 361 to 365 and the plural movable electrode fingers 371 to 375 are respectively arranged in the direction in which the movable part 33 is displaced (i.e., the X-axis direction).

Thereby, electrostatic capacitances between fixed electrode fingers 382, 384, 386, 388 of the fixed electrode part 38 and the movable electrode part 36 and electrostatic capacitances between fixed electrode fingers 381, 383, 385, 387 of the fixed electrode part 38 and the movable electrode part 36, which will be described later, may be efficiently changed in response to the displacement of the movable part 33.

Similarly, electrostatic capacitances between fixed electrode fingers 392, 394, 396, 398 of the fixed electrode part 39 and the movable electrode part 37 and electrostatic capacitances between fixed electrode fingers 391, 393, 395, 397 of the fixed electrode part 39 and the movable electrode part 37, which will be described later, may be efficiently changed in response to the displacement of the movable part 33.

The movable electrode part 36 is opposed to the fixed electrode part 38 with a gap. Further, the movable electrode part 37 is opposed to the fixed electrode part 39 with a gap.

The fixed electrode part 38 includes plural fixed electrode fingers 381 to 388 arranged like teeth of a comb meshing with the above described plural movable electrode fingers 361 to 365 of the movable electrode part 36 with gaps. The opposite ends of the fixed electrode fingers 381 to 388 to the movable part 33 side are respectively bonded to parts at the +Y direction side with respect to the recess part 21 of the principal surface 2a of the base substrate 2. Further, the respectively fixed electrode fingers 381 to 388 have the fixed side ends as fixed ends and the free ends extending in the −Y direction.

The fixed electrode fingers 381 to 388 are arranged from the −X direction side to the +X direction side in this order. Further, the fixed electrode fingers 381, 382 are paired and provided between the above described movable electrode fingers 361, 362, the fixed electrode fingers 383, 384 are paired and provided between the above described movable electrode fingers 362, 363, the fixed electrode fingers 385, 386 are paired and provided between the above described movable electrode fingers 363, 364, and the fixed electrode fingers 387, 388 are paired and provided between the above described movable electrode fingers 364, 365.

Here, the fixed electrode fingers 382, 384, 386, 388 are respectively first fixed electrode fingers (first fixed electrode parts), and the fixed electrode fingers 381, 383, 385, 387 are respectively second fixed electrode fingers (second fixed electrode parts) provided via air gaps (spaces) with respect to the first fixed electrode fingers on the base substrate 2.

As described above, the plural fixed electrode fingers 381 to 388 include the alternately arranged first fixed electrode fingers and second fixed electrode fingers. In other words, regarding the plural fixed electrode fingers 381 to 388, the first fixed electrode fingers are provided at one side of the movable electrode fingers and the second fixed electrode fingers are provided at the other side.

The first fixed electrode fingers 382, 384, 386, 388 and the second fixed electrode fingers 381, 383, 385, 387 are separated from each other on the base substrate 2. Thereby, the first fixed electrode fingers 382, 384, 386, 388 and the second fixed electrode fingers 381, 383, 385, 387 may be electrically insulated. Accordingly, the electrostatic capacitances between the first fixed electrode fingers 382, 384, 386, 388 and the movable electrode part 36 and the electrostatic capacitances between the second fixed electrode fingers 381, 383, 385, 387 and the movable electrode part 36 may be separately measured and a physical quantity may be detected with high accuracy based on the measurement results.

Similarly, the fixed electrode part 39 includes plural fixed electrode fingers 391 to 398 arranged like teeth of a comb meshing with the above described movable electrode fingers 371 to 375 of the movable electrode part 37 with gaps. The opposite ends of the fixed electrode fingers 391 to 398 to the movable part 33 are respectively bonded to parts at the −Y direction side with respect to the recess part 21 of the principal surface 2a of the base substrate 2. Further, the respective fixed electrode fingers 391 to 398 have the fixed side ends as fixed ends and the free ends extending in the +Y direction.

The fixed electrode fingers 391 to 398 are arranged from the −X direction side to the +X direction side in this order. Further, the fixed electrode fingers 391, 392 are paired and provided between the above described movable electrode fingers 371, 372, the fixed electrode fingers 393, 394 are paired and provided between the above described movable electrode fingers 372, 373, the fixed electrode fingers 395, 396 are paired and provided between the above described movable electrode fingers 373, 374, and the fixed electrode fingers 397, 398 are paired and provided between the above described movable electrode fingers 374, 375.

Here, the fixed electrode fingers 392, 394, 396, 398 are respectively first fixed electrode fingers (first fixed electrode parts), and the fixed electrode fingers 391, 393, 395, 397 are respectively second fixed electrode fingers (second fixed electrode parts) provided via air gaps (spaces) with respect to the first fixed electrode fingers on the base substrate 2.

As described above, the plural fixed electrode fingers 391 to 398 include the alternately arranged first fixed electrode fingers and second fixed electrode fingers. In other words, regarding the plural fixed electrode fingers 391 to 398, the first fixed electrode fingers are provided at one side of the movable electrode fingers and the second fixed electrode fingers are provided at the other side.

The first fixed electrode fingers 392, 394, 396, 398 and the second fixed electrode fingers 391, 393, 395, 397 are separated from each other on the base substrate 2 like the above described fixed electrode part 38. Thereby, the electrostatic capacitances between the first fixed electrode fingers 392, 394, 396, 398 and the movable electrode part 37 and the electrostatic capacitances between the second fixed electrode fingers 391, 393, 395, 397 and the movable electrode part 37 may be separately measured and a physical quantity may be detected with high accuracy based on the measurement results.

The constituent material of the sensor element 3 is not particularly limited as long as it may detect a physical quantity based on changes in electrostatic capacitance as described above, but a semiconductor material is preferable. Specifically, for example, it is preferable to use a silicon material such as single-crystal silicon or polysilicon.

That is, it is preferable that the fixed parts 31, 32, the movable part 33, the connection parts 34, 35, the plural fixed electrode fingers 381 to 388, 391 to 398, and the plural movable electrode fingers 361 to 365, 371 to 375 are respectively formed using silicon as a principal material.

The silicon may be processed with high accuracy by etching. Accordingly, by forming the sensor element 3 using silicon as the principal material, the dimension accuracy of the sensor element 3 may be made more advantageous and, as a result, higher sensitivity of the physical quantity sensor 1 may be realized. In addition, the silicon characteristically causes less elastic fatigue, and durability of the physical quantity sensor 1 may be improved.

Further, it is preferable that an impurity such as phosphorus or boron is doped in the silicon material forming the sensor element 3. Thereby, in the physical quantity sensor 1, conductivity of the sensor element 3 may be made more advantageous.

Furthermore, as described above, the sensor element 3 is supported by the base substrate 2 with the fixed parts 31, 32 and the fixed electrode parts 38, 39 bonded to the principal surface 2a of the base substrate 2.

A bonding method of the sensor element 3 and the base substrate 2 is not particularly limited, but anodic bonding is preferably used.

The wires 41 to 43 are provided at the principal surface 2a side of the above described base substrate 2.

Specifically, the wire 41 is provided outside of the recess part 21 of the above described base substrate 2 and formed along the outer periphery of the recess part 21 within the recess part 22. Further, one end of the wire 41 is connected to the electrode 44 in the outer periphery part of the principal surface 2a of the base substrate 2 (the part outside of the lid member 5 on the base substrate 2).

The wire 41 is electrically connected to the respective fixed electrode fingers 382, 384, 386, 388 and the respective fixed electrode fingers 392, 394, 396, 398 as the first fixed electrode fingers (first fixed electrode parts) of the above described sensor element 3.

Further, the wire 42 is provided inside of the above described wire 41 and outside of the recess part 21 of the above described base substrate 2 along the outer periphery thereof within the recess part 23. Further, one end of the wire 42 is connected to the electrode 45 in the outer periphery part of the principal surface 2a of the base substrate 2 (the part outside of the lid member 5 on the base substrate 2) on the side of the above described electrode 44 with a gap.

The wire 42 is electrically connected to the respective fixed electrode fingers 381, 383, 385, 387 and the respective fixed electrode fingers 391, 393, 395, 397 as the second fixed electrode fingers (second fixed electrode parts) of the above described sensor element 3.

The wire 43 is provided to extend from the bonded part to the fixed part 31 of the base substrate 2 to the outer periphery part of the principal surface 2a of the base substrate 2 (the part outside of the lid member 5 on the base substrate 2) within the recess part 24. Further, the end of the wire 43 opposite to the fixed part 31 side is connected to the electrode 46 in the outer periphery part of the principal surface 2a of the base substrate 2 (the part outside of the lid member 5 on the base substrate 2) on the side of the above described electrode 44 with a gap.

The constituent materials of the wires 41 to 43 are not limited as long as they have conductivity, but various electrode materials may be used. For example, oxides (transparent electrode materials) such as ITO (Indium Tin Oxide), IZO (Indium Zinc Oxide), $In_2O_3$, $SnO_2$, Sb-containing $SnO_2$, and Al-containing ZnO, Au, Pt, Ag, Cu, Al or alloys containing the metals, etc. are cited, and one or more of them may be combined for use.

It is preferable that transparent electrode materials (particularly, ITO) are used for the constituent materials of the wires 41 to 43. In the physical quantity sensor 1, when the wires 41 to 43 are formed by transparent electrode materials, in the case where the base substrate 2 is a transparent substrate, foreign matter or the like existing on the principal surface 2a of the base substrate 2 may be easily visually recognized from the opposite surface to the principal surface 2a of the base substrate 2.

Further, the constituent materials of the electrodes 44 to 46 are not particularly limited as long as they have conductivity like the above described wires 41 to 43, but various electrode materials may be used. In the embodiment, as the constituent materials of the electrodes 44 to 46, the same constituent materials as those of projection parts 471, 472, 481, 482, 50, which will be described later, are used.

Projection parts 481 having conductivity are respectively provided in the parts overlapping with the fixed electrode fingers 382, 384, 386, 388 of the sensor element 3 on the wire 41 in the plan view, and projection parts 482 having conductivity are respectively provided in the parts overlapping with the fixed electrode fingers 392, 394, 396, 398 on the wire 41 in the plan view.

Further, in the physical quantity sensor 1, the fixed electrode fingers 382, 384, 386, 388 and the wire 41 are electrically connected via the projection parts 481, and the fixed electrode fingers 392, 394, 396, 398 and the wire 41 are electrically connected via the projection parts 482.

Similarly, projection parts 471 having conductivity are respectively provided in the parts overlapping with the fixed electrode fingers 381, 383, 385, 387 of the sensor element 3 on the wire 42 in the plan view, and projection parts 472 having conductivity are respectively provided in the parts overlapping with the fixed electrode fingers 391, 393, 395, 397 on the wire 42 in the plan view.

Further, in the physical quantity sensor 1, the fixed electrode fingers 381, 383, 385, 387 and the wire 42 are electrically connected via the projection parts 471, and the fixed electrode fingers 391, 393, 395, 397 and the wire 42 are electrically connected via the projection parts 472.

Similarly, the projection part 50 having conductivity is provided in the part overlapping with the fixed part 31 of the sensor element 3 on the wire 43 in the plan view.

Further, in the physical quantity sensor 1, the fixed part 31 and the wire 43 are electrically connected via the projection part 50.

Here, in the physical quantity sensor 1, the thickness dimensions of the wires 41 to 43 are smaller than the depth dimensions of the recess parts 22 to 24, and the sum of the thickness dimensions of the wires 41 to 43 and the thickness dimensions of the projection parts 471, 472, 481, 482, 50 is larger than the depth dimensions of the recess parts 22 to 24 (except the electrode 44 to 46 parts).

Thereby, in the physical quantity sensor 1, when the base substrate 2 and the sensor element 3 are bonded, the base substrate 2 and the sensor element 3 closely contact and the wires 41 to 43 and the projection parts 471, 472, 481, 482, 50 are pressed against each other, and thereby, the above described electrical connection is reliably made.

The physical quantity sensor 1 may measure (detect) electrostatic capacitances between the first fixed electrode fingers 382, 384, 386, 388 and the movable electrode part 36 and electrostatic capacitances between the first fixed electrode fingers 392, 394, 396, 398 and the movable electrode part 37 using the electrode 44 (wire 41) and the electrode 46 (wire 43).

Further, the physical quantity sensor 1 may measure electrostatic capacitances between the second fixed electrode fingers 381, 383, 385, 387 and the movable electrode part 36 and electrostatic capacitances between the second fixed electrode fingers 391, 393, 395, 397 and the movable electrode part 37 using the electrode 45 (wire 42) and the electrode 46 (wire 43).

The constituent materials of the projection parts 471, 472, 481, 482, 50 are not limited as long as they respectively have conductivity, but various electrode materials may be used. For example, single metals of Au, Pt, Ag, Cu, Al or alloys containing the metals, etc. are preferably used.

In the physical quantity sensor 1, the projection parts 471, 472, 481, 482, 50 are formed using the metals, and thereby, connection resistance between the wires 41 to 43 and the fixed electrode parts 38, 39 and the fixed part 31 may be made smaller.

Further, as shown in FIG. 4, an insulating film 6 is provided on the wires 42, 43. Further, the insulating film 6 is not formed on the above described projection parts 471, 472, 481, 482, 50, and the surfaces (upper surfaces) of the projection parts 471, 472, 481, 482, 50 are exposed. Note that, though not illustrated, the insulating film 6 is also provided on the wire 41.

The insulating film 6 has a function of avoiding electrical connection (short circuit) between the wires 41 to 43 and the non-connection parts of the sensor element 3.

Thereby, in the physical quantity sensor 1, the electrical connection between the first fixed electrode fingers 382, 384, 386, 388, 392, 394, 396, 398 and the wire 41 may be made while short circuit between the wire 41 and the non-connection part is more reliably avoided, the electrical connection between the second fixed electrode fingers 381, 383, 385, 387, 391, 393, 395, 397 and the wire 42 may be made while short circuit between the wire 42 and the non-connection part is more reliably avoided, and the electrical connection between the fixed part 31 and the wire 43 may be made while short circuit between the wire 43 and the non-connection part is more reliably avoided.

In the embodiment, the insulating film 6 is formed nearly in the entire region of the principal surface 2a of the base substrate 2 except the formation regions of the projection parts 471, 472, 481, 482, 50 and the electrodes 44 to 46. Note that the formation region of the insulating film 6 is not limited to that as long as it may cover the wires 41 to 43, but may have a shape except the bonding part of the principal surface 2a of the base substrate 2 to the sensor element 3 and the bonding part to the lid member 5 may be employed, for example.

The constituent material of the insulating film 6 is not particularly limited, but various materials having an insulation property may be used. In the case where the base substrate 2 is formed by a glass material (especially, a glass material with added alkali metal ions), silicon dioxide ($SiO_2$) is preferably used. Thereby, in the physical quantity sensor 1, the above described short circuit may be avoided.

Further, the thickness (average thickness) of the insulating film 6 is not particularly limited, but is preferably about 10 to 1000 nm and more preferably about 10 to 200 nm. In the physical quantity sensor 1, when the insulating film 6 is formed in the thickness range, the above described short circuit may be avoided.

In addition, in the physical quantity sensor 1, in the case where the base substrate 2 is formed by a glass material containing alkali metal ions and the sensor element 3 is formed principally using silicon, even when the insulating film 6 exists in the bonding part of the principal surface 2a of the base substrate 2 and the sensor element 3, the base substrate 2 and the sensor element 3 may be anodically bonded via the insulating film 6.

The shield part 4 is provided between the wire 41 and the wire 42 and between the wire 42 and the wire 43 on the principal surface 2a of the base substrate 2 via the insulating film 6 in a wall shape having a nearly rectangular section to separate the wire 41 and the wire 42, and the wire 42 and the wire 43. The shield part 4 has a function of reducing parasitic capacitances between the wire 41 and the wire 42, and the wire 42 and the wire 43.

It is preferable that the shield part 4 is formed so that a ratio (H/W) of the distance W from the wires 42, 43 to the height H shown in FIG. 4 may be "1" to "20". Regarding the shield part 4, when H/W is smaller than "1", the function (shield effect) of reducing the parasitic capacitance between the wires 42, 43 becomes weaker, and, when H/W is larger than "20", the manufacturing time by etching etc. becomes longer and the productivity may be lower.

In the embodiment, as a preferable example, H/W is set to 6.25 (H: 25 μm, W: 4 μm).

Note that the height differences between the wires 42, 43 and the shield part 4 are dimensionally negligible with respect to H/W in practice.

The same is true for the dimensional relationship between the wire 41 and the shield part 4.

The shield part 4 is provided in a position that does not interfere with the fixed electrode fingers 381 to 388 and 391 to 398 of the sensor element 3. In the embodiment, the shield part 4 is divided into a left part and a right part of the fixed electrode fingers 381 to 388.

The left part of the shield part 4 extends from the left side (−X direction side) of the fixed electrode finger 381 in the −X direction, is flexed in the −Y direction along the wire 41 and the wire 42, and provided to near the inner wall of the lid member 5, and further provided between the wire 42 and the wire 43 along the inner wall of the lid member 5.

On the other hand, the right part of the shield part 4 extends from the right side (+X direction side) of the fixed electrode finger 388 in the +X direction, is flexed in the −Y direction along the wire 41 and the wire 42, then, flexed in the −X direction, and provided to near the fixed electrode finger 398.

The shield part 4 is electrically independent from the wires 41 to 43 and adapted to be at different potentials (for example, GND) from those of the wires 41 to 43 via wiring (not shown). The connection structures between the shield part 4 and the wires are similar to the connection structures between the fixed electrode fingers 381 to 388, 391 to 398 and the wires 41, 42.

The constituent material of the shield part 4 is not particularly limited as long as it is a semiconductor or conductor, but various materials may be used. For example, silicon, oxides (transparent electrode materials) such as ITO, IZO, $In_2O_3$, $SnO_2$, Sb-containing $SnO_2$, and Al-containing ZnO, Au, Pt, Ag, Cu, Al or alloys containing the metals, etc. are cited, and one or more of them may be combined for use.

Note that, in the case where silicon is used for the constituent material of the shield part 4, it is preferable that an impurity such as phosphorus or boron is doped. Thereby, in the physical quantity sensor 1, conductivity of the shield part 4 may be made more advantageous.

It is preferable that the constituent material of the shield part 4 may be the same material as that of the fixed electrode parts 38, 39 (sensor element 3). Thereby, in the physical quantity sensor 1, for example, the shield part 4 and the fixed electrode parts 38, 39 (sensor element 3) may be collectively formed using a photolithography technology and an etching technology from one silicon substrate, and the shield part 4 may be bonded to the base substrate 2 by anodic bonding.

The constituent material of the shield part 4 is not limited to semiconductor or conductor as long as it may reduce parasitic capacitances between the wires 41, 42 and between the wires 42, 43.

The lid member 5 has a function of protecting the above described sensor element 3 and shield part 4.

The lid member 5 has a plate-like shape, and a recess part 51 is provided on one surface (lower surface) thereof. The recess part 51 is formed with air gaps between the sensor element 3 and itself and between the shield part 4 and itself so that the movable part 33 and the movable electrode parts 36, 37 etc. of the sensor element 3 may be displaced.

Further, the lower surface of the lid member 5 is bonded to the above described principal surface 2*a* of the base substrate 2. The bonding method of the lid member 5 and the base substrate 2 is not particularly limited, but, for example, a bonding method using an adhesive, anodic bonding, direct bonding, or the like may be used.

Furthermore, the constituent material of the lid member 5 is not particularly limited as long as it may fulfill the above described function, but, for example, a silicon material, a glass material, or the like may be preferably used.

Next, an example of a manufacturing method of the physical quantity sensor 1 will be explained.

FIGS. 5A to 5E, FIGS. 6F to 6H, and FIGS. 7A to 7D are schematic sectional views for explanation of a manufacturing process of the physical quantity sensor.

The manufacturing method of the physical quantity sensor 1 includes a wire forming step, an insulating film forming step, a bonding step, a sensor element and shield part forming step, a lid member bonding step, and a separating step.

Here, the explanation will be made on the assumption that plural sensors are manufactured in one process, however, they may be individually manufactured.

Wire Forming Step

Figure 5A:
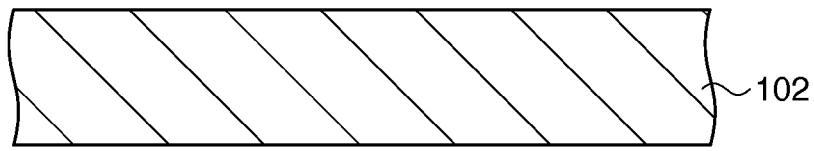
FIGS. 5A to 5E are schematic sectional views for explanation of a manufacturing process of the physical quantity sensor.

First, as shown in FIG. 5A, a wafer-like substrate 102 to be separated into base substrates 2 is prepared.

Figure 5B:
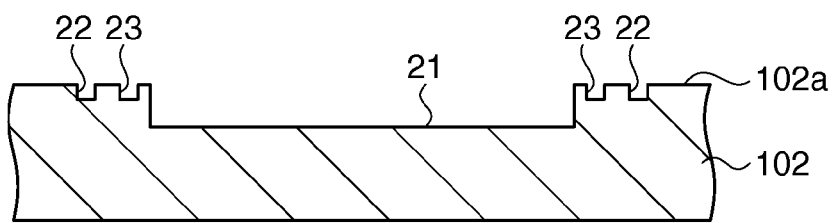

Then, as shown in FIG. 5B, the recess parts 21 to 23 are formed by etching the upper surface (principal surface 2*a*) of the base substrate 2. Though not illustrated in FIG. 5B, the recess part 24 is formed in the same manner.

The forming method (etching method) of the recess parts 21 to 24 is not particularly limited, but, for example, one or more of a physical etching method such as plasma etching, reactive ion etching, beam etching, photo-assisted etching, or the like, a chemical etching method such as wet etching may be used in combination. Note that, in the etching at the following respective steps, the same method may be used.

Further, in the above described etching, for example, a mask formed by photolithography may be preferably used. Furthermore, the recess part 21 and the recess parts 22 to 24 may be sequentially formed by repeating mask formation, etching, mask removal at plural times. Then, the masks are removed after etching. As the removing method of the masks, for example, a resist pealing liquid may be used when the masks are formed using resist materials, and a metal peeling liquid such as a phosphoric acid solution may be used when the masks are formed using metal materials.

Note that, as the masks, for example, grayscale masks are used, and thereby, the recess part 21 and the recess parts 22 to 24 (plural recess parts with different depths) may be collectively formed.

Figure 5C:
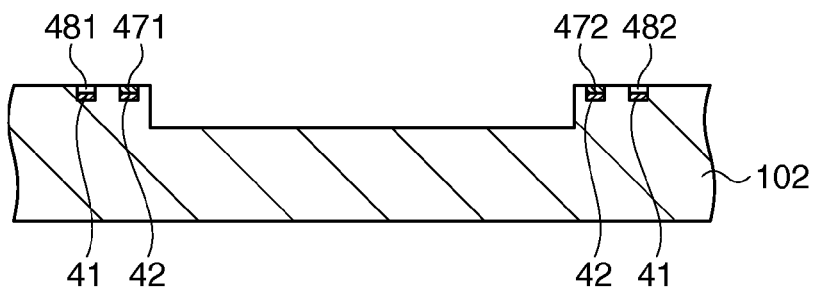
Figure 5D:
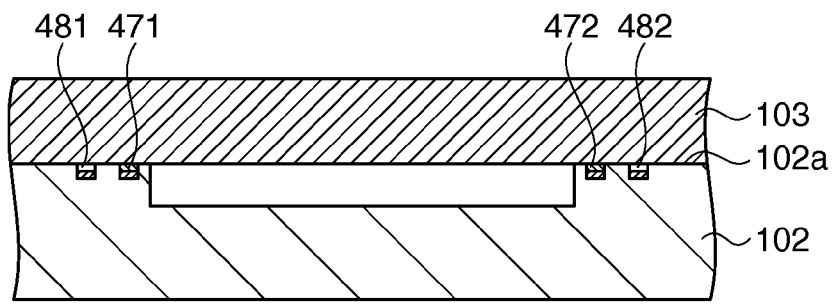

Then, as shown in FIG. 5C, the wires 41 to 43 and the projection parts 471, 472, 481, 482, 50 are formed on the substrate 102.

As below, the formation of the wires 41 to 43 and the projection parts 471, 472, 481, 482, 50 will be described in detail with reference to FIGS. 7A to 7D.

Figure 7A:
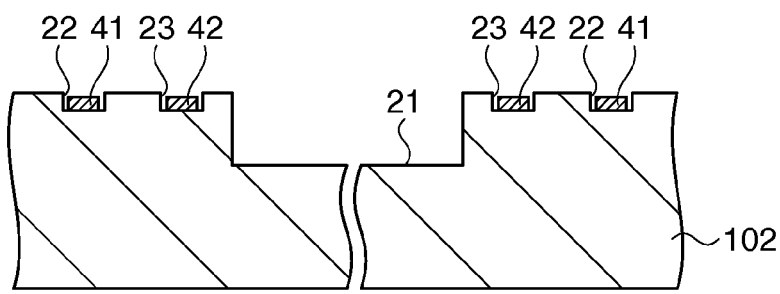
FIGS. 7A to 7D are schematic sectional views for explanation of a manufacturing process of the physical quantity sensor.

First, as shown in FIG. 7A, the wire 41 is formed within the recess part 22 and the wire 42 is formed within the recess part 23. In this regard, though not illustrated in FIGS. 7A to 7D, the wire 43 is formed within the recess part 43 collectively with the wires 41, 42.

Figure 7B:
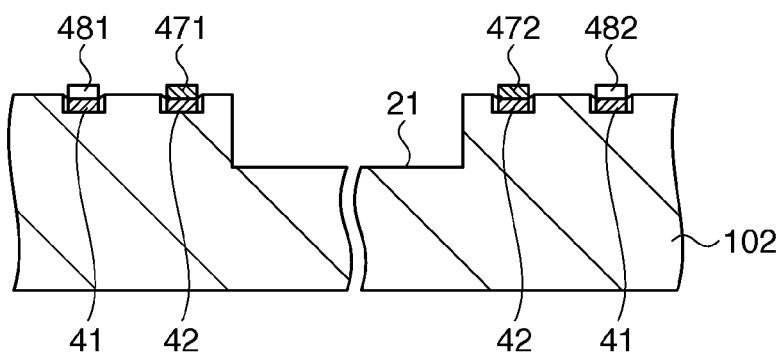

Then, as shown in FIG. 7B, the plural projection parts 481, 482 are formed (deposited) on the wire 41, and the plural projection parts 471, 472 are formed on the wire 42. In this regard, though not illustrated in FIG. 7B, the electrode 44 is formed on the wire 41, the electrode 45 is formed on the wire 42, and the projection part 50 and the electrode 46 are formed on the wire 43.

The forming method (depositing method) of the wires 41 to 43 and the projection parts 471, 472, 481, 482, 50 is not particularly limited, but, for example, vacuum evaporation, sputtering (low-temperature sputtering), dry plating such as ion plating, wet plating such as electrolytic plating or non-electrolytic plating, thermal spraying, thin-film bonding, or the like may be cited. The same method may be used in the deposition at the following respective steps.

Note that, for the substrate 102, an insulating substrate having an insulation property is preferably used, and a transparent substrate is more preferably used as the insulating substrate. Specifically, for the substrate 102, a glass substrate using a glass material containing alkali metal ions (movable ions) (for example, borosilicate glass such as Pyrex (registered trademark) glass) is preferably used.

Further, as the constituent material of the wires 41 to 43, a transparent electrode material (specifically, ITO) is preferably used.

Insulating Film Forming Step

Figure 7C:
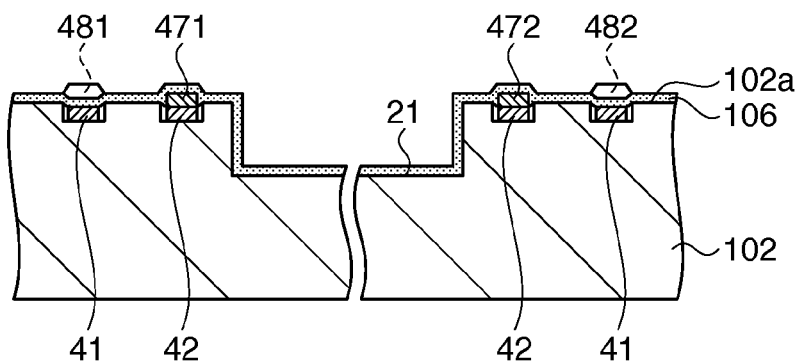

Next, as shown in FIG. 7C, an insulating film 106 is formed (deposited) on the principal surface 102*a* of the base substrate 102 to cover the wires 41, 42. Here, the insulating film 106 is to be separated into insulating films 6 as will be described below.

Figure 7D:
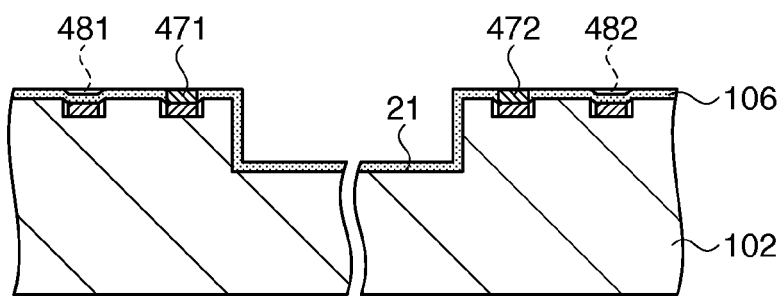

Then, as shown in FIG. 7D, the parts of the insulating film 106 covering the projection parts 471, 472, 481, 482 are removed. Further, though not illustrated in FIG. 7D, the parts of the insulating film 106 covering the projection part 50 and the electrodes 44 to 46 are also removed. Thereby, the projection parts 471, 472, 481, 482, 50 and the electrodes 44 to 46 are exposed.

Note that, in this regard, the upper surfaces of the projection parts 471, 472, 481, 482, 50 are nearly at the same level with the upper surface of the insulating film 106.

Bonding Step

Returning to FIGS. 5A to 5D, then, as shown in FIG. 5D, a wafer-like sensor substrate 103 to be plural sensor elements 3 and shield parts 4 is prepared, and the sensor substrate 103 is bonded to the principal surface 102*a* of the base substrate 102. Thereby, the sensor substrate 103 and the projection parts 471, 472, 481, 482 are connected. Though not illustrated in FIG. 5D, the sensor substrate 103 and the projection part 50 are connected in the same manner.

Note that, for bonding of the substrate 102 and the sensor substrate 103, the anodic bonding is preferably used.

Here, it is preferable that the sensor substrate 103 is made thicker than the thickness of the sensor element 3. Thereby, handling of the sensor substrate 103 may be improved (for example, damage is reduced at transportation, setup, or the like). Note that the thickness of the sensor substrate 103 may be the same as the thickness of the sensor element 3 from the start.

For the sensor substrate 103, a silicon substrate as a semiconductor substrate is preferably used, and Au is preferably used for the constituent material of the projection parts 471, 472, 481, 482, 50 for reduction of contact resistance.

Figure 5E:
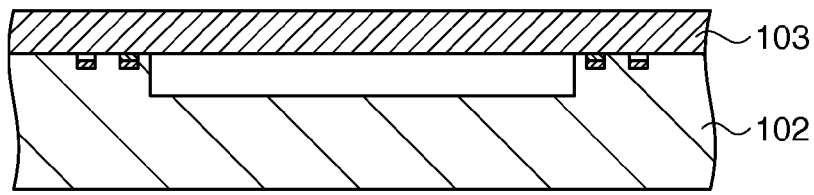

Then, as shown in FIG. 5E, the sensor substrate 103 is made thinner to the thickness of the sensor element 3. The thinning method is not particularly limited, but, for example, CMP or dry polishing may be preferably used.

Note that, when the thickness of the sensor substrate 103 is initially the same as the thickness of the sensor element 3 from the start, the thinning step is unnecessary.

Sensor Element and Shield Part Forming Step

Figure 6F:
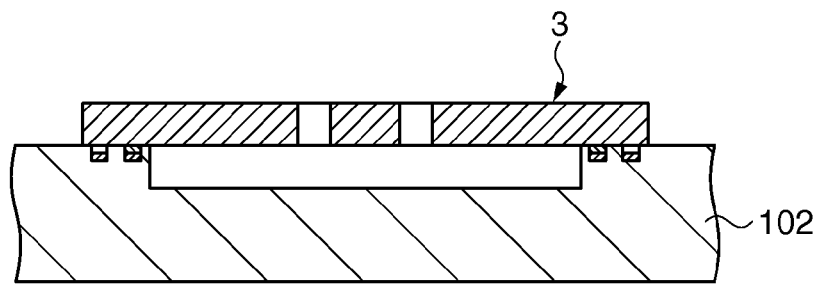
FIGS. 6F to 6H are schematic sectional views for explanation of the manufacturing process of the physical quantity sensor.

Next, as shown in FIG. 6F, the sensor substrate 103 is etched, and thereby, the sensor elements 3 and the shield parts 4 (see FIG. 4) are formed.

Note that the shield parts 4 are electrically connected to electrodes (not shown) provided on the substrate 102 via wires and projection parts (not shown) formed by the same forming method as that of the wires 41 to 43, the electrodes 44 to 46, and the projection parts 471, 472, 481, 482, 50.

Lid Member Bonding Step

Figure 6G:
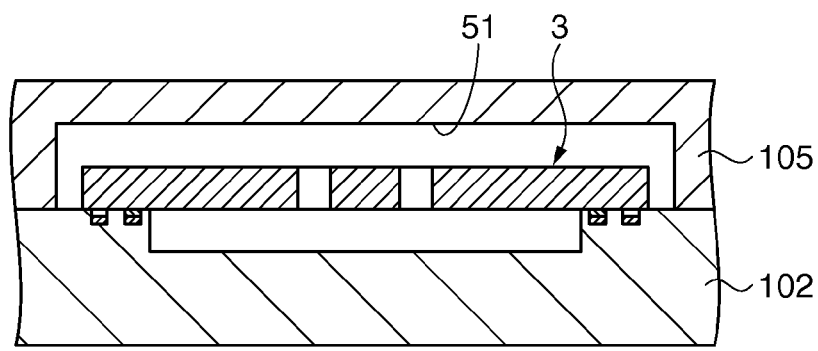

Next, as shown in FIG. 6G, a wafer-like substrate 105 having plural recess parts 51 to be separated into lid members 5 is bonded to the principal surface 102a of the base substrate 102. Thereby, the substrate 102 and the substrate 105 accommodate the respective sensor elements 3 and the respective shield parts 4 within the respective recess parts 51.

Note that the bonding method of the substrate 102 and the substrate 105 is not particularly limited, but, for example, a bonding method using an adhesive, anodic bonding, direct bonding, or the like may be used.

Separating Step

Figure 6H:
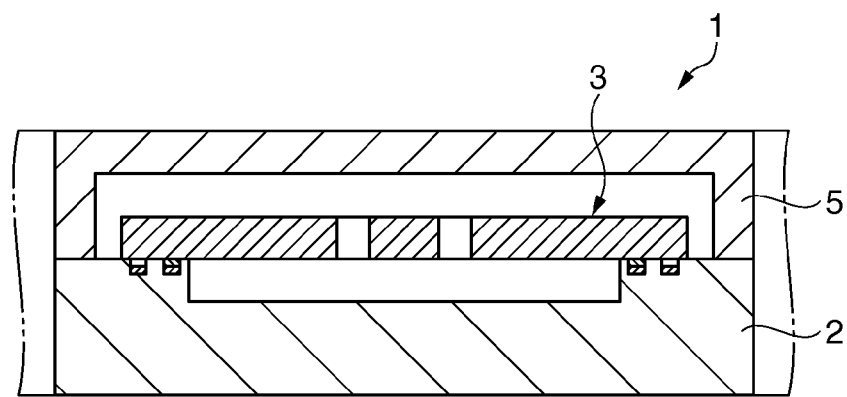

Next, as shown in FIG. 6H, the substrate 102 and the substrate 105 that have integrally accommodated the sensor elements 3 are separated into individual pieces with respect to each sensor element 3 and shield part 4 using a separating device (dicing device) (not shown), and thereby, the physical quantity sensor 1 is obtained.

Note that, by the separation, the substrate 102 becomes the base substrates 2 and the substrate 105 becomes the lid members 5.

As described above, in the physical quantity sensor 1 of the embodiment, the first fixed electrode fingers (first fixed electrode parts) 382, 384, 386, 388, 392, 394, 396, 398 are connected to the wire 41 provided at the principal surface 2a side of the base substrate 2, and the second fixed electrode fingers (second fixed electrode parts) 381, 383, 385, 387, 391, 393, 395, 397 are connected to the wire 42 provided at the principal surface 2a side of the base substrate 2. Additionally, in the physical quantity sensor 1, the movable electrodes 36, 37 are connected to the wire 43 provided at the principal surface 2a side of the base substrate 2 via the movable part 33.

Further, in the physical quantity sensor 1, the shield part 4 to separate the wire 41 and the wire 42, and the wire 42 and the wire 43 is provided in parts between the wire 41 and the wire 42 and between the wire 42 and the wire 43.

Thereby, in the physical quantity sensor 1, the parasitic capacitances between the wire 41 and the wire 42 and between the wire 42 and the wire 43 at physical quantity detection are reduced by the shield part 4, and thereby, the difference between the detected electrostatic capacitance value and the original electrostatic capacitance value may be reduced.

Therefore, in the physical quantity sensor 1, the detection characteristics such as detection accuracy may be improved. As a result, in the physical quantity sensor 1, reliability in physical quantity detection may be improved.

Further, in the physical quantity sensor 1, semiconductor such as silicon or conductor such as ITO, IZO, Au, Pt, Ag, Cu, or Al is used as the constituent material of the shield part 4, and thus, the parasitic capacitances between the wire 41 and the wire 42 and between the wire 42 and the wire 43 at physical quantity detection may be reliably reduced.

Furthermore, in the physical quantity sensor 1, the recess parts 22 to 24 are provided on the principal surface 2a of the base substrate 2 and the wires 41 to 43 are provided within the recess parts 22 to 24, and thus, projection of the wires 41 to 43 from the principal surface 2a of the base substrate 2 may be avoided.

As a result, in the physical quantity sensor 1, short circuit of the wires 41 to 43 and the non-connection members (for example, the wire 41 and the second fixed electrode fingers 381, 383, 385, 387, 391, 393, 395, 397 and the wire 42 and the first fixed electrode fingers 382, 384, 386, 388, 392, 394, 396, 398) may be avoided.

Further, in the physical quantity sensor 1, the recess parts 22 to 24 may further separate between the wire 41 and the wire 42 and between the wire 42 and the wire 43, and thus, the parasitic capacitances between the wire 41 and the wire 42 and between the wire 42 and the wire 43 at physical quantity detection may be further reduced.

Furthermore, in the physical quantity sensor 1, the base substrate 2 is formed by the material (insulating material) having the insulation property such as borosilicate glass and the sensor element 3 is formed by the semiconductor material such as silicon, and thus, the insulation and isolation between the base substrate 2 and the sensor element 3 may be reliably performed.

In addition, in the physical quantity sensor 1, the shield part 4 is formed by the same material (for example, silicon) as that of the sensor element 3, and thus, for example, the shield part 4 and sensor element 3 may be collectively formed from one silicon substrate using a photolithography technology and an etching technology.

As a result, regarding the physical quantity sensor 1, productivity may be improved compared to the case where the materials of the shield part 4 and sensor element 3 are different.

Electronic Apparatus

Next, an electronic apparatus including the physical quantity sensors of the embodiment and modified examples will be explained.

Figure 8:
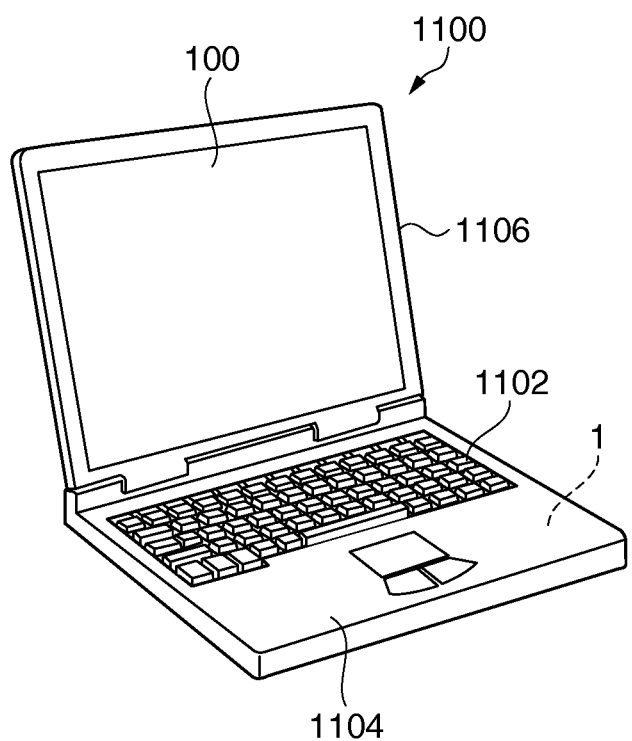
FIG. 8 is a perspective view showing an electronic apparatus (notebook personal computer) including the physical quantity sensor.

FIG. 8 is a perspective view showing a configuration of a mobile (or notebook) personal computer as an electronic apparatus including the physical quantity sensor.

As shown in FIG. 8, a personal computer 1100 includes a main body unit 1104 having a keyboard 1102 and a display unit 1106 having a display part 100, and the display unit 1106 is rotatably supported via a hinge structure part with respect to the main body unit 1104.

The personal computer 1100 contains the physical quantity sensor 1.

Figure 9:
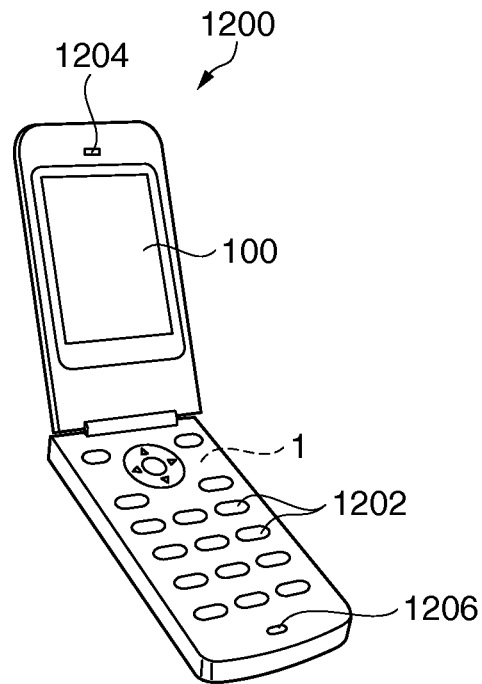
FIG. 9 is a perspective view showing an electronic apparatus (cellular phone) including the physical quantity sensor.

FIG. 9 is a perspective view showing a configuration of a cellular phone (including PHS) as an electronic apparatus including the physical quantity sensor.

As shown in FIG. 9, a cellular phone 1200 includes plural operation buttons 1202, an ear piece 1204, and a mouthpiece 1206, and a display part 100 is provided between the operation buttons 1202 and the ear piece 1204.

The cellular phone 1200 contains the physical quantity sensor 1.

Figure 10:
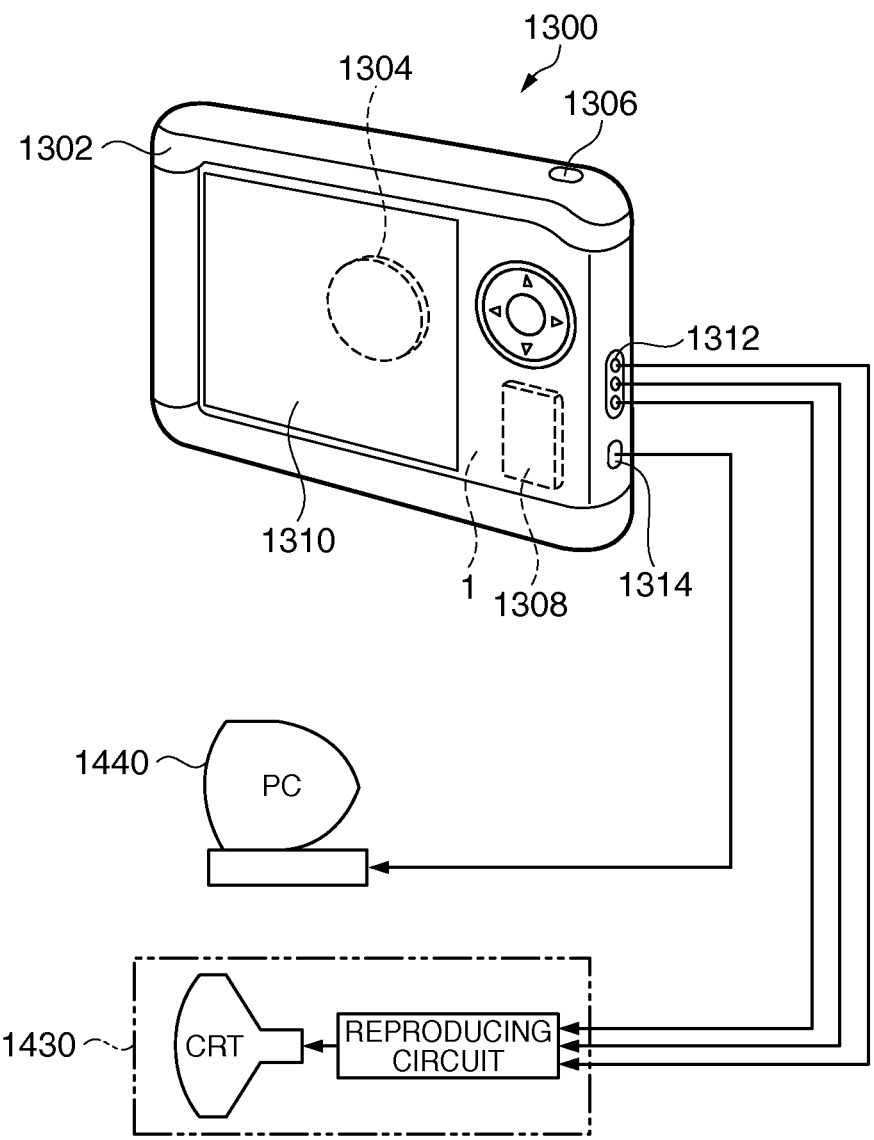
FIG. 10 is a perspective view showing an electronic apparatus (digital still camera) including the physical quantity sensor.

FIG. 10 is a perspective view showing a configuration of a digital still camera as an electronic apparatus including the physical quantity sensor. In FIG. 10, connection to an external device is simply shown.

Here, in a typical camera, a silver halide photographic film is exposed to light by an optical image of a subject, on the other hand, a digital still camera 1300 photoelectrically converts an optical image of a subject using an image sensing device such as a CCD (Charge Coupled Device) and generates imaging signals (image signals).

On a back surface (on the front side in the drawing) of a case (body) 1302 in the digital still camera 1300, a display part 1310 is provided and adapted to display based on the imaging signals by the CCD, and the display part 1310 functions as a finder that displays the subject as an electronic image.

Further, on the front side (the depth side in the drawing) of the case 1302, a light receiving unit 1304 including an optical lens (imaging system), the CCD, etc. is provided.

When a photographer checks the subject image displayed on the display part 1310 and presses down a shutter button 1306, the imaging signals of the CCD at the time are transferred and stored in a memory 1308.

Further, in the digital still camera 1300, a video signal output terminal 1312 and an input/output terminal for data communication 1314 are provided on the side surface of the case 1302. Furthermore, a television monitor 1430 is connected to the video signal output terminal 1312 and a personal computer 1440 is connected to the input/output terminal for data communication 1314, respectively, according to need. In addition, by predetermined operation, the imaging signals stored in the memory 1308 are output to the television monitor 1430 and the personal computer 1440.

The digital still camera 1300 contains the physical quantity sensor 1.

The electronic apparatus may provide superior performance by including the physical quantity sensor 1 with higher accuracy and advantageous reliability.

The electronic apparatus including the physical quantity sensor may be applied not only to the personal computer (mobile personal computer) in FIG. 8, the cellular phone in FIG. 9, and the digital still camera in FIG. 10 but also to an inkjet ejection device (for example, an inkjet printer), a laptop personal computer, a television, a video camera, a video tape recorder, various navigation systems, a pager, a personal digital assistance (with or without communication function), an electronic dictionary, a calculator, an electronic game machine, a word processor, a work station, a videophone, a security television monitor, electronic binoculars, a POS terminal, medical devices (for example, an electronic thermometer, a sphygmomanometer, a blood glucose meter, an electrocardiographic measurement system, an ultrasonic diagnostic system, an electronic endoscope), a fish finder, various measurement instruments, meters and gauges (for example, meters for vehicles, airplanes, and ships), a flight simulator, etc.

The physical quantity sensor and an electronic apparatus according to the embodiments of the invention have been explained according to the illustrated embodiment and modified examples, however, the invention is not limited to those.

For example, the fixed electrode part is not limited to the above described embodiment and modified examples as long as at least one fixed electrode finger of the plural fixed electrode fingers arranged like teeth of a comb is separated from the other fixed electrode fingers on a substrate having an insulation property.

Further, forms of the numbers, arrangements, sizes of the plural fixed electrode fingers of the fixed electrode part and the plural movable electrode fingers of the movable electrode part provided to mesh with those fingers are not limited to those of the above described embodiment and modified examples.

Furthermore, the movable part may be adapted to be displaced in the Y-axis direction, or adapted to be rotated around an axis line in parallel to the X-axis. In this case, a physical quantity may be detected based on an electrostatic capacitance change due to a change in opposed area of the movable electrode fingers and the fixed electrode fingers.

The entire disclosure of Japanese Patent Application No. 2011-178253, filed Aug. 17, 2011 is expressly incorporated by reference herein.

What is claimed is:

1. A physical quantity sensor comprising:
a substrate having first and second recesses in a principal surface;
a movable part supported on the substrate;
a movable electrode part provided in the movable part; and
a fixed electrode part provided on the principal surface of the substrate and located to be opposed to the movable electrode part,
wherein the fixed electrode part is connected to fixed electrode wiring provided on a first bottom surface of the first recess in the substrate, an end of the fixed electrode wiring is located at a first side of the principal surface, the fixed electrode wiring extends toward a center of the substrate, and a first depth of the first recess is larger than a first thickness of the fixed electrode wiring,
the movable electrode part is connected to movable electrode wiring provided on a second bottom surface of the second recess in the substrate, an end of the movable electrode wiring is located at the first side of the principal surface, the movable electrode wiring is located in a direction along an extended direction of the fixed electrode wiring at the first side of the principal surface, and a second depth of the second recess is larger than a second thickness of the movable electrode wiring, and
a first shield part is provided on the principal surface of the substrate at least between the fixed electrode wiring and the movable electrode wiring at the first side, and the first shield part does not overlap with the fixed electrode wiring and the movable electrode wiring in a plan view,
wherein the substrate has first and second end recesses at the first side of the principal surface, and the first and second end recesses are continuously provided with the first and second recesses, respectively, the end of the fixed electrode wiring is located at the first end recess, and the end of the movable electrode wiring is located at the second end recess, and a third depth of the first end recess is larger than the first depth of the first recess, and a fourth depth of the second end recess is larger than the second depth of the second recess.

2. The physical quantity sensor according to claim 1, wherein the fixed electrode part has a first fixed electrode part located at one side of the movable electrode part and a second fixed electrode part located at the other side,
the fixed electrode wiring includes a first wire connected to the first fixed electrode part and a second wire connected to the second fixed electrode part, and
a second shield part is provided in at least one part between the first wire and the second wire.

3. The physical quantity sensor according to claim 1, wherein an insulating material is used for the substrate, and a semiconductor material is used for the movable part, the movable electrode part, and the fixed electrode part.

4. The physical quantity sensor according to claim 1, wherein the movable part, the movable electrode part, the fixed electrode part, and the first shield part are formed by a same material.

5. An electronic apparatus comprising the physical quantity sensor according to claim 1.

6. The physical quantity sensor according to claim 1, wherein
a third thickness of the first shield part is larger than the first thickness of the fixed electrode wiring.

7. The physical quantity sensor according to claim 1, wherein
a third thickness of the first shield part is larger than the second thickness of the movable electrode wiring.

8. The physical quantity sensor according to claim 7, wherein
the third thickness of the first shield part is larger than the first thickness of the fixed electrode wiring.

9. A physical quantity sensor comprising:
a substrate having first through third recesses in a principal surface, the principal surface having a first side and a second side opposite to the first side;
a movable part supported on the substrate;
a movable electrode part provided in the movable part; and
a fixed electrode part provided on the principal surface of the substrate and located to be opposed to the movable electrode part, wherein
the fixed electrode part is connected to first and second fixed electrode wirings respectively provided on a first bottom surface of the first recess and a second bottom surface of the second recess in the substrate, ends of the first and second fixed electrode wirings are located at the first side of the principal surface, the first and second fixed electrode wirings extend toward the second side of the principal surface via a center of the substrate, a first depth of the first recess is larger than a first thickness of the first fixed electrode wiring, and a second depth of the second recess is larger than a second thickness of the second fixed electrode wiring,
the movable electrode part is connected to movable electrode wiring provided on a third bottom surface of the third recess in the substrate, an end of the movable electrode wiring is located at the first side of the principal surface, the movable electrode wiring is located in a direction along an extended direction of the first and second fixed electrode wirings at the first side of the principal surface, a third depth of the third recess is larger than a third thickness of the movable electrode wiring, and
a first shield part is provided on the principal surface of the substrate between the second fixed electrode wiring and the movable electrode wiring at the first side, the first shield part does not overlap with the fixed electrode wiring and the movable electrode wiring in a plan view, and the first and second fixed electrode wirings sandwich the first shield part in the second side of the principal surface, wherein the substrate has first and third end recesses at the first side of the principal surface, and the first and third end recesses are continuously provided with the first and third recesses, respectively, the end of the fixed electrode wiring is located at the first end recess, and the end of the movable electrode wiring is located at the third end recess, and a fourth depth of the first end recess is larger than the first depth of the first recess, and a fifth depth of the third end recess is larger than the third depth of the third recess.

10. The physical quantity sensor according to claim 9, wherein
an insulating material is used for the substrate, and
a semiconductor material is used for the movable part, the movable electrode part, and the fixed electrode part.

11. The physical quantity sensor according to claim 9, wherein
the movable part, the movable electrode part, the fixed electrode part, and the first shield part are formed by a same material.

12. An electronic apparatus comprising the physical quantity sensor according to claim 9.

13. The physical quantity sensor according to claim 11, wherein
a layer thickness of the first shield part is larger than the first and second thicknesses of the first and second fixed electrode wirings.

14. The physical quantity sensor according to claim 9, wherein
a layer thickness of the first shield part is larger than the third thickness of the movable electrode wiring.

15. The physical quantity sensor according to claim 14, wherein
the layer thickness of the first shield part is larger than the first and second thicknesses of the first and second fixed electrode wirings.

* * * * *